United States Patent
Fujita

(10) Patent No.: US 10,761,413 B2
(45) Date of Patent: Sep. 1, 2020

(54) PROJECTION DISPLAY DEVICE, CONTROL METHOD FOR PROJECTION DISPLAY DEVICE, AND CONTROL PROGRAM FOR PROJECTION DISPLAY DEVICE

(71) Applicant: FUJIFILM Corporation, Tokyo (JP)

(72) Inventor: Koudai Fujita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/417,665

(22) Filed: May 21, 2019

(65) Prior Publication Data

US 2019/0271905 A1 Sep. 5, 2019

Related U.S. Application Data

(63) Continuation of application No. PCT/JP2017/035837, filed on Oct. 2, 2017.

(30) Foreign Application Priority Data

Dec. 12, 2016 (JP) .................. 2016-240502

(51) Int. Cl.
*G03B 21/14* (2006.01)
*B60K 35/00* (2006.01)
(Continued)

(52) U.S. Cl.
CPC ............ *G03B 21/145* (2013.01); *B60K 35/00* (2013.01); *G03B 21/00* (2013.01); *G03B 21/142* (2013.01);
(Continued)

(58) Field of Classification Search
CPC ................ G02B 27/0101; G02B 27/01; B60K 2370/1529
See application file for complete search history.

(56) References Cited

U.S. PATENT DOCUMENTS

| 5,005,010 A | 4/1991 | Misaki et al. |
| 2008/0049331 A1* | 2/2008 | Nakamura ......... G02B 27/0101 359/630 |

(Continued)

FOREIGN PATENT DOCUMENTS

| JP | S60105531 | 7/1985 |
| JP | S63145726 | 9/1988 |

(Continued)

OTHER PUBLICATIONS

"International Search Report (Form PCT/ISA/210) of PCT/JP2017/035837," dated Dec. 19, 2017, with English translation thereof, pp. 1-5.

(Continued)

*Primary Examiner* — Chun-Nan Lin
(74) *Attorney, Agent, or Firm* — JCIPRNET

(57) ABSTRACT

A HUD including a projection display unit, a housing, a cover, a region detection unit, an object removing mechanism and an object removal control unit is provided. The projection display unit spatially modulates light emitted from a light source as image information and projects image light obtained from spatial modulation onto a windshield to display an image. The housing accommodates the projection display unit and has an opening portion through which the image light exits. The cover covers the opening portion. The region detecting unit detects an object adhesion region in which the object is adhered to the cover. The object removing mechanism removes an object adhered to a front surface of the cover by scraping the front surface of the cover. The object removal control unit activates the object removing mechanism when important display content is included in a portion of the image light, the portion being blocked.

5 Claims, 8 Drawing Sheets

1 Automobile
2 Windshield
4 Dashboard
8 Connecting unit
H Steering wheel

(51) Int. Cl.
*G03B 21/20* (2006.01)
*H04N 5/74* (2006.01)
*G03B 21/00* (2006.01)

(52) U.S. Cl.
CPC .............. *G03B 21/206* (2013.01); *H04N 5/74* (2013.01); *H04N 5/7416* (2013.01); *B60K 2370/1529* (2019.05); *B60K 2370/21* (2019.05); *B60K 2370/334* (2019.05); *B60K 2370/693* (2019.05)

(56) References Cited

U.S. PATENT DOCUMENTS

| | | | | |
|---|---|---|---|---|
| 2013/0343053 | A1* | 12/2013 | Holman | G03B 21/00 362/241 |
| 2015/0309206 | A1* | 10/2015 | Kuntze | G01S 17/003 701/45 |
| 2018/0093619 | A1* | 4/2018 | Han | B62D 15/0285 |

FOREIGN PATENT DOCUMENTS

| | | |
|---|---|---|
| JP | 2005075230 | 3/2005 |
| JP | 2006011122 | 1/2006 |
| JP | 2008068767 | 3/2008 |
| JP | 2010188870 | 9/2010 |
| JP | 2014068328 | 4/2014 |
| JP | 2015113088 | 6/2015 |
| JP | 2015535206 | 12/2015 |
| JP | 2016141272 | 8/2016 |

OTHER PUBLICATIONS

"Written Opinion of the International Searching Authority (Form PCT/ISA/237) of PCT/JP2017/035837," dated Dec. 19, 2017, with English translation thereof, pp. 1-9.

* cited by examiner

1 Automobile
2 Windshield
3 Housing
4 Dashboard
5 Control unit
6 Diffusion member
7 Concave mirror
8 Connecting unit
9 Cover
10 Image capturing unit
11 Object removing mechanism
100 HUD
K Opening portion
E Eye
T Sweeper 1 Automobile
2 Windshield
4 Dashboard
8 Connecting unit
H Steering wheel

| | | | |
|---|---|---|---|
| 4 | Dashboard | 11A | Movable portion |
| 8 | Connecting unit | 11B, 11C | Rail |
| 9 | Cover | 11D, 11E | Dust box |
| | | 90 | Light exit area |
| | | 91 | Object |
| | | X, Y | Direction |

PROJECTION DISPLAY DEVICE, CONTROL METHOD FOR PROJECTION DISPLAY DEVICE, AND CONTROL PROGRAM FOR PROJECTION DISPLAY DEVICE

CROSS-REFERENCE TO RELATED APPLICATIONS

This application is a Continuation of PCT International Application No. PCT/JP2017/035837 filed on Oct. 2, 2017, which claims priority under 35 U.S.C. § 119(a) to Japanese Patent Application No. 2016-240502 filed on Dec. 12, 2016. Each of the above application(s) is hereby expressly incorporated by reference, in its entirety, into the present application.

BACKGROUND OF THE INVENTION

1. Field of the Invention

The present invention relates to a projection display device, a control method for a projection display device, and a non-transitory computer readable recording medium storing a control program for a projection display device.

2. Description of the Related Art

An HUD (head-up display) for vehicles is known that uses the windshield of a vehicle, such as an automobile, a train, a ship, a heavy machine, a construction machine, an aircraft, or an agricultural machine, or a combiner disposed near the windshield as a screen and projects light onto the screen to display images. Such an HUD can be used to allow an image based on light projected from the HUD to be visible to the driver as a real image on the screen or a virtual image ahead of the screen.

JP2015-113088A describes an HUD equipped with an object removing mechanism that removes an object adhered to an exit surface through which image light to be projected onto a windshield exits. This object removing mechanism is configured to be activated in response to turning on or off the ignition switch of the vehicle or turning on or off display on the HUD.

JP2005-075230A describes an HUD in which, in a case where an object is adhered to an exit surface through which image light to be projected onto a windshield exits and visibility of information is compromised, an object removing mechanism for removing the object can be activated in accordance with the user's intention even if an image is being displayed.

SUMMARY OF THE INVENTION

In a configuration as described in JP2015-113088A and JP2005-075230A in which the exit surface through which image light exits is wiped with a brush, a blade, etc. to remove an object adhered to the exit surface, the exit surface is scraped with a brush, a blade, etc. each time the object removing mechanism operates, and the exit surface may be worn and display quality may be degraded. Accordingly, it is preferable to limit the number of times the exit surface is cleaned to the minimum necessary.

In the HUD described in JP2015-113088A, the object removing mechanism is activated in response to turning on or off the ignition switch of the vehicle or turning on or off display on the HUD. Therefore, the exit surface through which image light exits is cleaned frequently, and the exit surface may be worn and display quality may be affected.

JP2005-075230A discloses the configuration that allows cleaning of the exit surface to start in response to a user operation while an image is displayed. However, in a case where dirt is adhered to the exit surface, information that is missing due to the dirt is displayed as a transparent image, and therefore, it is difficult for the user to be aware of the adhered dirt. Accordingly, in the case where cleaning is performed in response to a user operation, cleaning might not be appropriately performed.

The present invention has been made in view of the above circumstances, and an object thereof is to provide a projection display device, a control method for a projection display device, and a non-transitory computer readable recording medium storing a control program for a projection display device with which an exit surface through which image light exits is appropriately cleaned to maintain display quality.

A projection display device according to the present invention includes: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; an object removing mechanism that removes an object adhered to a front surface of the cover by scraping the front surface of the cover; a region detecting unit that detects an object adhesion region in which the object is adhered to the cover; and an object removal control unit that controls an operation of the object removing mechanism, in which the object removal control unit activates the object removing mechanism in a case where predetermined display content is included in a portion of the image light, the portion being blocked due to the object adhesion region detected by the region detecting unit.

A control method for a projection display device according to the present invention is a control method for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an object removing mechanism that removes an object adhered to a front surface of the cover by scraping the front surface of the cover, the control method including: a region detecting step of detecting an object adhesion region in which the object is adhered to the cover; and an object removal control step of controlling an operation of the object removing mechanism, in which in the object removal control step, the object removing mechanism is activated in a case where predetermined display content is included in a portion of the image light, the portion being blocked due to the object adhesion region detected in the region detecting step.

A non-transitory computer readable recording medium storing a control program for a projection display device according to the present invention is a control program for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an object removing mechanism that removes an object adhered to a front surface of the cover by scraping the front surface of the cover, the control program causing a computer to execute a process including: a region detecting step of detecting an object adhesion region in which the object is adhered to the cover; and an object removal control step of controlling an operation of the object removing mechanism, in which in the object removal control step, the object removing mechanism is activated in a case where predetermined display content is included in a portion of the image light, the portion being blocked due to the object adhesion region detected in the region detecting step.

According to the present invention, it is possible to provide a projection display device, a control method for a projection display device, and a non-transitory computer readable recording medium storing a control program for a projection display device with which an exit surface through which image light exits is appropriately cleaned to maintain display quality.

DESCRIPTION OF THE PREFERRED EMBODIMENTS

Hereinafter, an embodiment of the present invention will be described with reference to the drawings.

Figure 1:
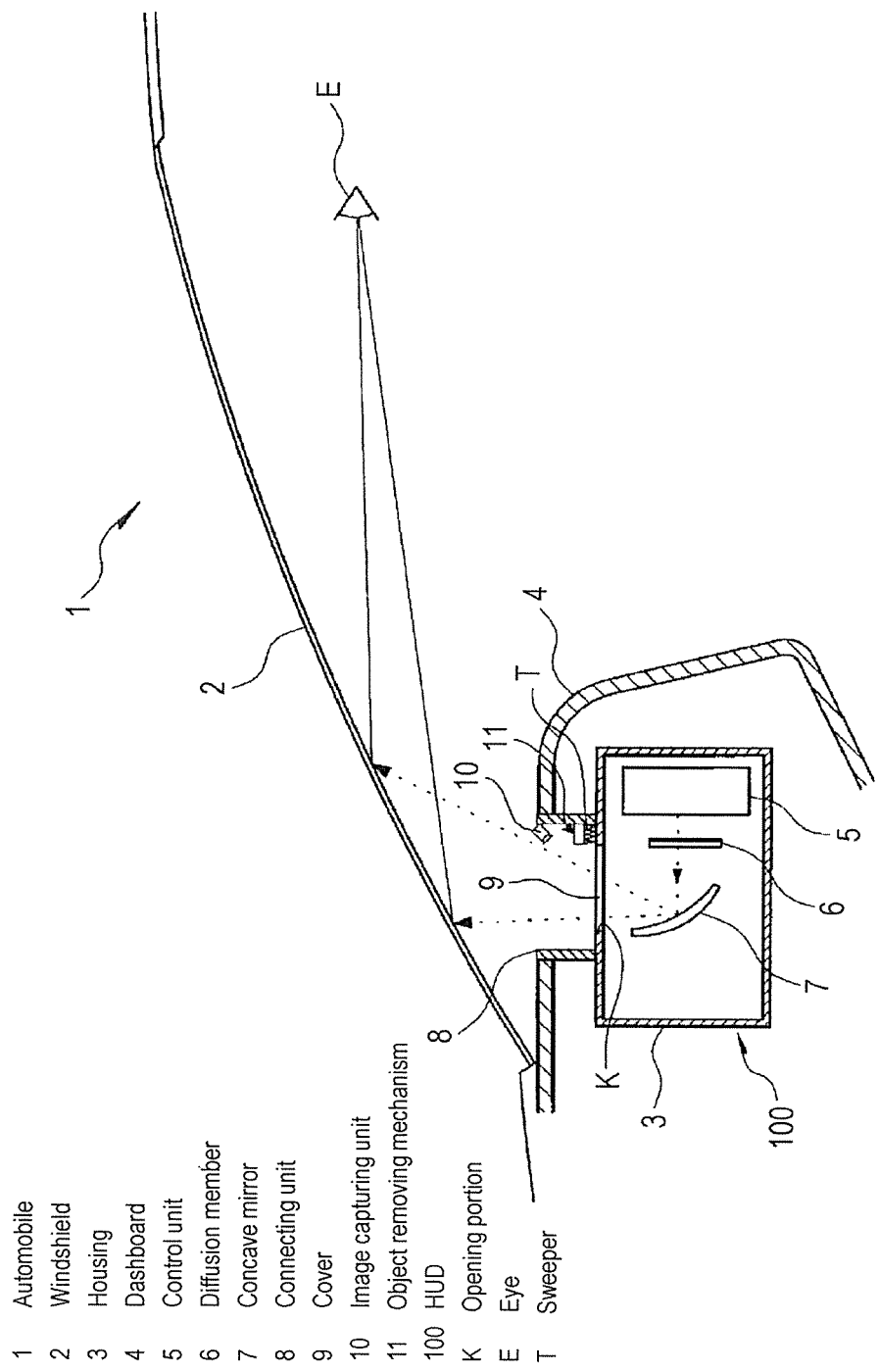
FIG. 1 is a diagram illustrating an overall configuration of an HUD 100, which is an embodiment of a projection display device of the present invention.

FIG. 1 is a diagram illustrating an overall configuration of an HUD 100, which is an embodiment of a projection display device of the present invention.

The HUD 100 is mounted in an automobile 1, uses a partial area of a windshield 2 of the automobile 1 as a projection surface, and makes a virtual image or a real image visible to the driver of the automobile 1 with image light projected onto the projection surface.

The HUD 100 can be mounted and used in a vehicle other than an automobile, such as a train, a heavy machine, a construction machine, an aircraft, a ship, or an agricultural machine.

The HUD 100 is built in a dashboard 4 of the automobile 1 such that part thereof is exposed. The dashboard 4 is a member in which interior components including measuring instruments, such as a speedometer, a tachometer, a fuel gauge, a water-temperature gauge, or an odometer, of the automobile 1 for indicating information necessary for traveling are integrated.

The HUD 100 includes a housing 3, a connecting unit 8, an image capturing unit 10, and an object removing mechanism 11. The housing 3 has a box form and accommodates a control unit 5, a diffusion member 6, and a concave mirror 7. The control unit 5 includes a light source and a light modulating unit that spatially modulates light emitted from the light source on the basis of image information. The diffusion member 6 and the concave mirror 7 constitute a projection optical system for projecting image light obtained as a result of spatial modulation by the light modulating unit onto the windshield 2. The connecting unit 8 has a tubular form and connects the housing 3 with an opening portion of the dashboard 4. The configuration of the projection optical system is an example and is not limited to that illustrated in FIG. 1.

In the housing 3, an opening portion K is formed, and the periphery of the opening portion K of the housing 3 is connected with the opening portion of the dashboard 4 via the connecting unit 8.

The diffusion member 6 is a member that diffuses image light obtained as a result of spatial modulation by the light modulating unit of the control unit 5 so as to become a surface light source. As the diffusion member 6, a micromirror array having a microstructure on a surface thereof, a diffusion mirror, an MLA (microlens array) diffuser, a reflective holographic diffuser, etc. is used.

The concave mirror 7 enlarges image light diffused by the diffusion member 6 and reflects the image light toward the projection surface of the windshield 2. The image light reflected by the concave mirror 7 passes through the opening portion K of the housing 3 and a hollow portion of the connecting unit 8 and is projected toward the projection surface of the windshield 2.

The windshield 2 is processed so that image light passing through the opening portion K and the hollow portion of the connecting unit 8 and projected is reflected in the direction of an eye E of the driver, and the image light is reflected by the windshield 2 and incident on the eye E of the driver. Accordingly, the driver can view an image (virtual image or real image) based on the image light.

The opening portion K of the housing 3 is covered by a cover 9 made of resin, glass etc. that can transmit image light. The opening portion K is an exit window that allows image light reflected by the concave mirror 7 to exit from the housing 3, and the cover 9 is used to prevent dust, liquids, etc. from entering the housing 3 through the opening portion K.

The image capturing unit 10 includes an imaging device and an image processing unit that processes a captured image signal obtained by the imaging device performing image capturing and generates captured image data. The image capturing unit 10 is fixed to the internal wall of the connecting unit 8 at a position above the cover 9 and is disposed so that an image of the front surface of the cover 9 (the surface opposite the inside of the housing 3) can be captured. The captured image data obtained by the image capturing unit 10 performing image capturing is transferred to a system control unit 47 described below of the control unit 5.

The object removing mechanism 11 is a mechanism that removes an object adhered to the front surface of the cover 9 by scraping the front surface. Although details will be described below, the object removing mechanism 11 moves a movable portion including a sweeper T, which is, for example, a brush, a blade, etc., for scraping the front surface, along the front surface of the cover 9 and sweeps the object into a dust box not illustrated with the sweeper T to thereby remove the object adhered to the front surface of the cover 9.

The HUD 100 employs the method in which image light is projected onto the windshield 2; however, the HUD 100 may employ a method in which image light is projected onto a combiner (not illustrated) disposed near the windshield 2. In this case, the combiner constitutes the projection surface.

Figure 2:
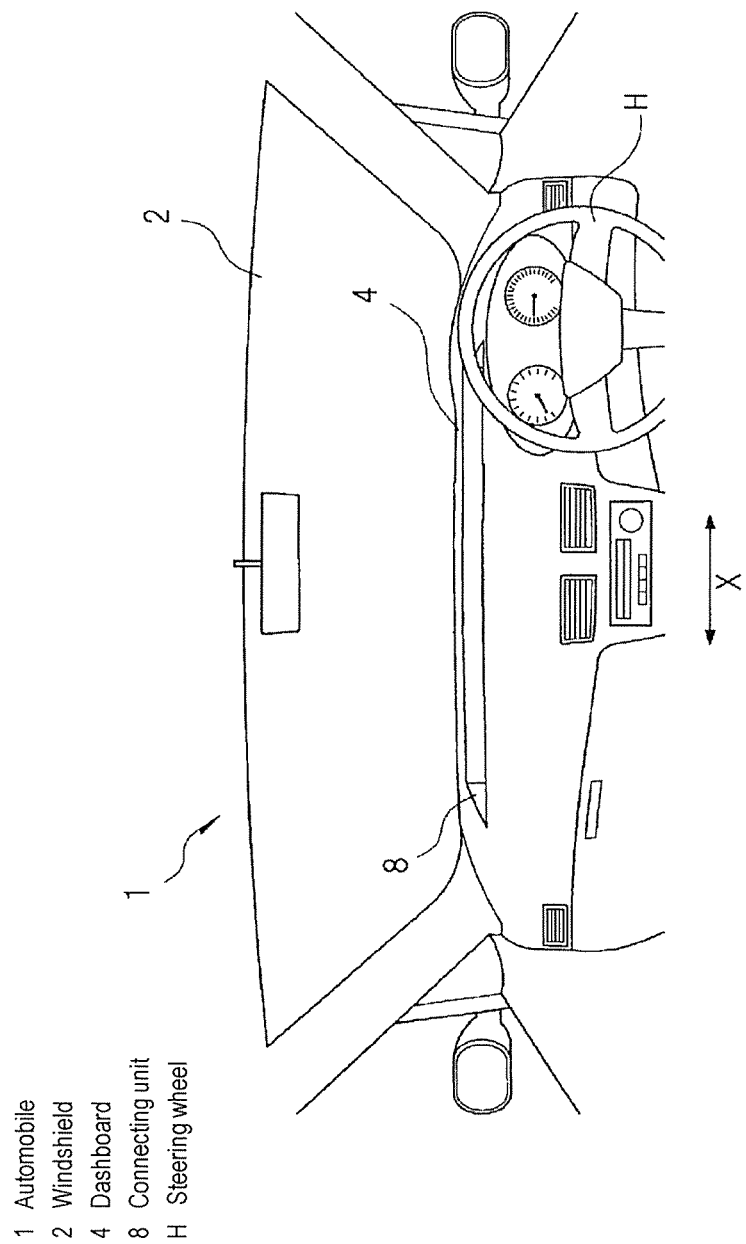
FIG. 2 is a diagram illustrating an external view of a connecting unit 8 illustrated in FIG. 1.

FIG. 2 is a diagram illustrating an external view of the connecting unit 8 illustrated in FIG. 1.

As illustrated in FIG. 2, the hollow portion of the connecting unit 8 is a substantially rectangular parallelepiped portion, and the planar shape of the cover 9 that is located at the base end of the connecting unit 8 when viewed in the direction in which image light exits is a rectangular shape in which the longitudinal direction corresponds to a direction X in which the driver's seat and the passenger seat of the automobile 1 are disposed side by side. Accordingly, the cover 9 has a shape that is long in the direction X, and therefore, images can be displayed in a wide area of the windshield 2.

The automobile 1 is configured such that the driver's seat is disposed at a position facing a steering wheel H illustrated in FIG. 2 and the passenger seat is disposed to the left or to the right (in the example, to the left) of the driver's seat. The direction X in which the driver's seat and the passenger seat of the automobile 1 are disposed side by side is equivalent to a direction substantially orthogonal to the direction of movement of the automobile 1 in a case where the automobile 1 moves straight. The state where two directions are substantially orthogonal to each other is a state where the angle made by the two directions is within a range from 70 degrees to 110 degrees.

Figure 3:
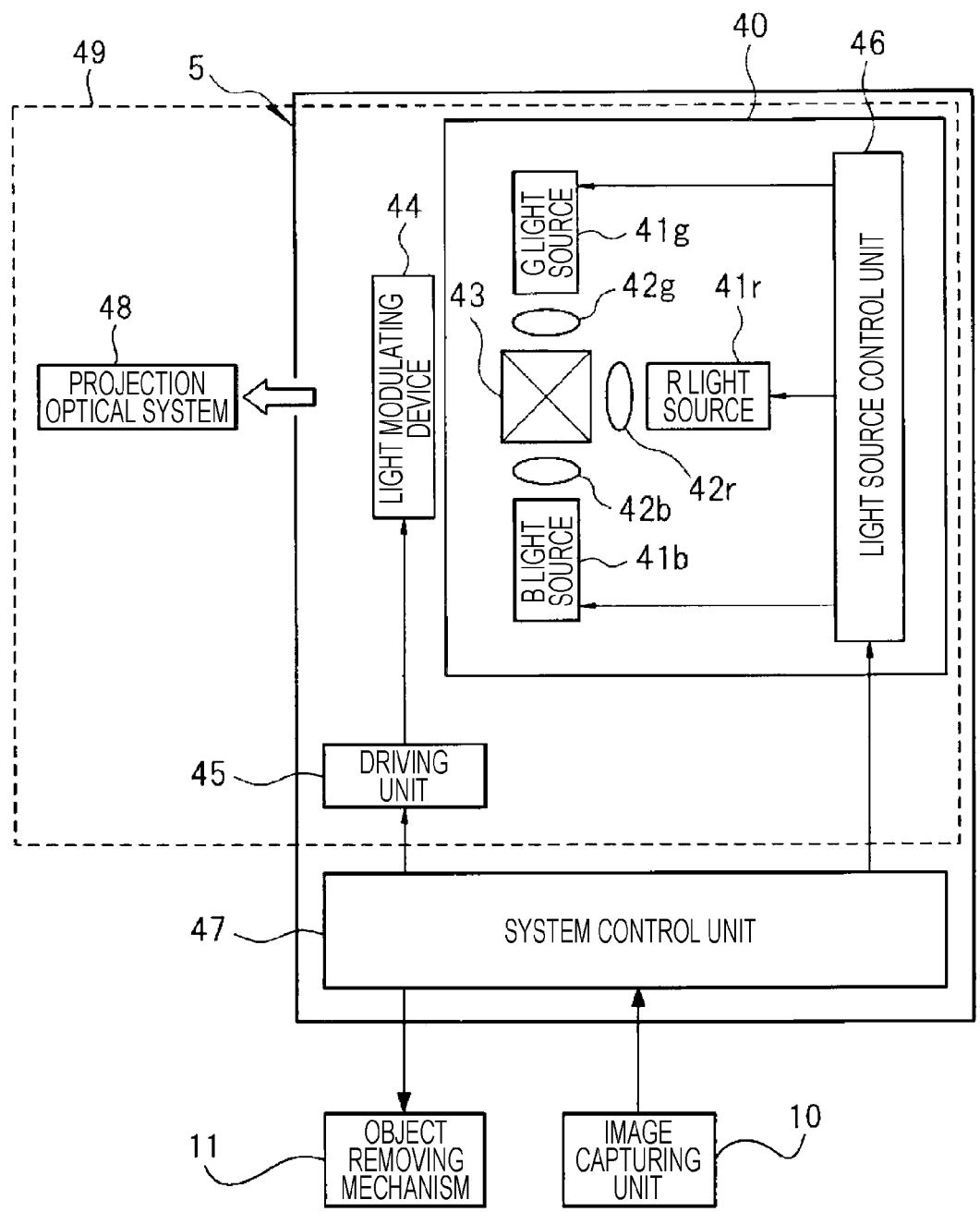
FIG. 3 is a schematic diagram illustrating an example internal configuration of a control unit 5 accommodated in a housing 3 of the HUD 100 illustrated in FIG. 1.

FIG. 3 is a schematic diagram illustrating an example internal configuration of the control unit 5 accommodated in the housing 3 of the HUD 100 illustrated in FIG. 1.

As illustrated in FIG. 3, the control unit 5 of the HUD 100 includes a light source unit 40, a light modulating device 44, a driving unit 45 that drives the light modulating device 44, and the system control unit 47 that controls the HUD 100 as a whole. FIG. 3 illustrates a projection optical system 48, which is constituted by the diffusion member 6 and the concave mirror 7 illustrated in FIG. 1.

The system control unit 47 includes a processor, a ROM (read-only memory) in which programs, etc. executed by the processor are stored, and a RAM (random access memory) that functions as a work memory of the processor. The programs stored in the ROM include a control program for the HUD 100.

The light source unit 40 includes a light source control unit 46, an R light source 41r that is a red light source emitting red light, a G light source 41g that is a green light source emitting green light, a B light source 41b that is a blue light source emitting blue light, a dichroic prism 43, a collimator lens 42r that is provided between the R light source 41r and the dichroic prism 43, a collimator lens 42g that is provided between the G light source 41g and the dichroic prism 43, and a collimator lens 42b that is provided between the B light source 41b and the dichroic prism 43. The R light source 41r, the G light source 41g, and the B light source 41b constitute the light source of the HUD 100.

The dichroic prism 43 is an optical member for guiding rays of light emitted from the R light source 41r, the G light source 41g, and the B light source 41b to the same optical path. The dichroic prism 43 transmits red light collimated by the collimator lens 42r and allows the red light to exit therefrom toward the light modulating device 44. The dichroic prism 43 reflects green light collimated by the collimator lens 42g and allows the green light to exit therefrom toward the light modulating device 44. The dichroic prism 43 reflects blue light collimated by the collimator lens 42b and allows the blue light to exit therefrom toward the light modulating device 44. The optical member having such a function is not limited to a dichroic prism and, for example, a cross dichroic mirror may be used.

As the R light source 41r, the G light source 41g, and the B light source 41b, light emitting devices, such as lasers or LEDs (light emitting diodes), are used. The light source of the HUD 100 need not be constituted by three light sources, namely, the R light source 41r, the G light source 41g, and the B light source 41b, in the example and may be constituted by one light source, two light sources, or four or more light sources.

The light source control unit 46 controls each of the R light source 41r, the G light source 41g, and the B light source 41b to cause the R light source 41r, the G light source 41g, and the B light source 41b to emit rays of light.

The light modulating device 44 spatially modulates rays of light emitted from the R light source 41r, the G light source 41g, and the B light source 41b and exiting from the dichroic prism 43 on the basis of image information input from the system control unit 47.

As the light modulating device 44, for example, LCOS (liquid crystal on silicon), a DMD (digital micromirror device), a MEMS (micro-electro-mechanical systems) device, or a liquid crystal display device can be used.

The driving unit 45 drives the light modulating device 44 on the basis of image information input from the system control unit 47 and causes image light (red image light, blue image light, and green image light) obtained as a result of spatial modulation based on the image information to exit from the light modulating device 44 toward the diffusion member 6 of the projection optical system 48. The light modulating device 44 and the driving unit 45 constitute the light modulating unit of the HUD 100.

The projection optical system 48 constituted by the diffusion member 6 and the concave mirror 7 illustrated in FIG. 1 is optically designed so that an image based on image light projected onto the windshield 2 is visible to the driver as a virtual image at a position ahead of the windshield 2. The projection optical system 48 may be optically designed so that the image based on image light is visible to the driver as a real image on the windshield 2.

The system control unit 47 controls the light source control unit 46 and the driving unit 45 to cause image light obtained as a result of spatial modulation based on image information to exit toward the diffusion member 6.

The projection optical system 48, the light modulating unit constituted by the light modulating device 44 and the driving unit 45, and the light source unit 40 constitute a projection display unit 49.

Figure 4:
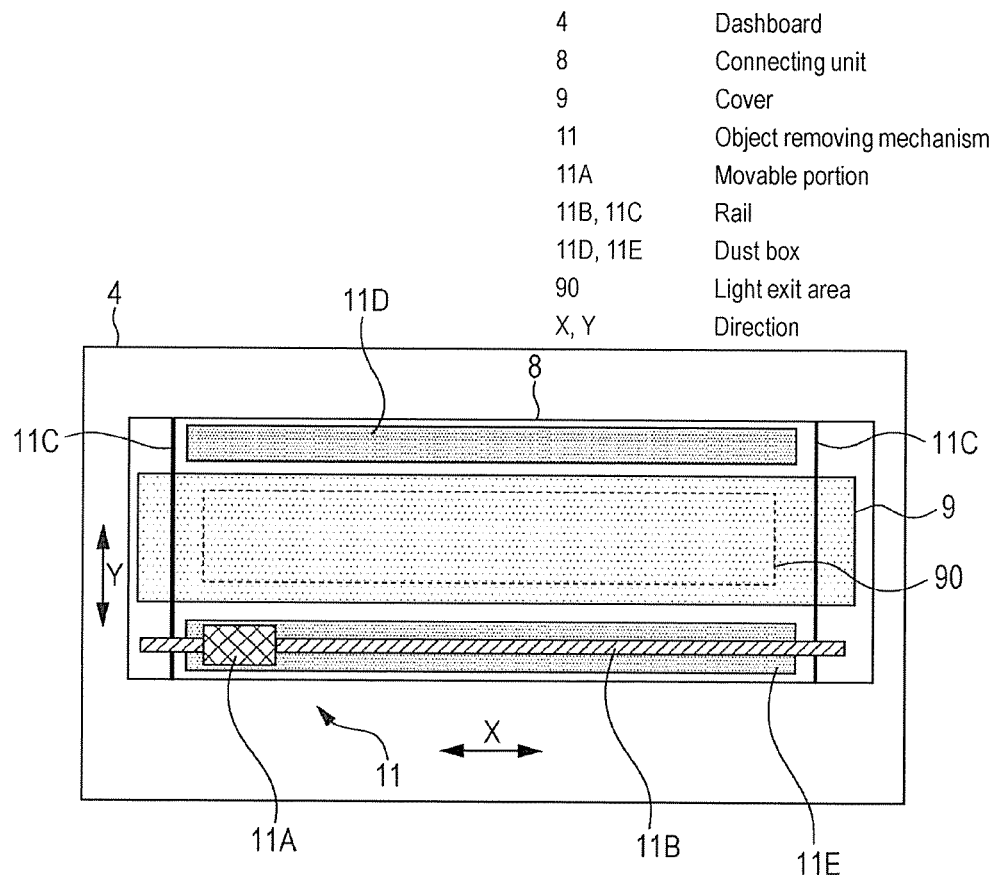
FIG. 4 is a schematic diagram illustrating an example detailed configuration of an object removing mechanism 11 in the HUD 100 illustrated in FIG. 1.
Figure 5:
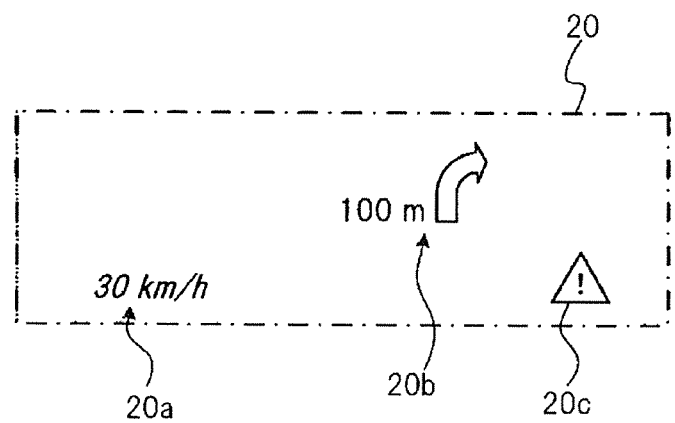
FIG. 5 is a diagram illustrating example images displayed by the HUD 100 illustrated in FIG. 1.

FIG. 4 is a schematic diagram illustrating an example detailed configuration of the object removing mechanism 11 in the HUD 100 illustrated in FIG. 1. FIG. 4 illustrates a state where the connecting unit 8 of the HUD 100 is viewed in a direction perpendicular to the front surface of the cover 9. FIG. 5 is a diagram illustrating example images displayed by the HUD 100 illustrated in FIG. 1.

As illustrated in FIG. 4, on the front surface of the cover 9, a light exit area 90 that is an area through which image light passing through the projection optical system 48 exits is present. The light exit area 90 has a rectangular shape in the example illustrated in FIG. 4, and the width in the direction X is wider than the width in a direction Y orthogonal to the direction X. The direction Y corresponds to a first direction, and the direction X corresponds to a second direction.

When image light exiting through the light exit area 90 is projected onto the windshield 2, images based on the image light are visible to the driver, as illustrated in FIG. 5.

FIG. 5 illustrates images 20a, 20b, and 20c visible to the driver who sits on the driver's seat of the automobile 1 and a display area 20 that indicates the maximum area in which images can be displayed by the projection display unit 49.

In the example illustrated in FIG. 5, image information input to the driving unit 45 includes information corresponding to the three images, namely, the image 20a, the image 20b, and the image 20c and, on the basis of image light obtained as a result of spatial modulation based on the image information, the image 20a, the image 20b, and the image 20c are displayed in the display area 20. In the display area 20, a region other than the regions of the image 20a, the image 20b, and the image 20c is transparent to allow checking of the scene ahead of the windshield 2.

Note that the image 20a illustrated in FIG. 5 includes text that indicates the travel speed of the automobile 1. The image 20b includes text and an arrow for navigation. The image 20c includes an icon for warning.

As illustrated in FIG. 4, the object removing mechanism 11 includes a movable portion 11A that is movable in the direction X and in the direction Y orthogonal to the direction X for scraping the front surface of the cover 9, a rail 11B that extends in the direction X, a pair of rails 11C that are fixed to the side walls of the connecting unit 8 and extend in the direction Y, and dust boxes 11D and 11E that are formed as holes provided in portions of the housing 3. The movable portion 11A, the rail 11B, and the rails 11C are each provided above the cover 9 in the hollow portion of the connecting unit 8.

The movable portion 11A is supported by the rail 11B so as to be movable in the direction X. The object removing mechanism 11 includes a first driving motor (not illustrated) for moving the movable portion 11A over the rail 11B in the direction X, and the first driving motor is controlled by the system control unit 47.

The rail 11B is supported by the pair of rails 11C so as to be movable in the direction Y. The object removing mechanism 11 includes a second driving motor (not illustrated) for moving the rail 11B over the pair of rails 11C in the direction Y, and the second driving motor is controlled by the system control unit 47.

The dust boxes 11D and 11E are formed as holes that are provided in partial portions of a portion of the housing 3 exposed in the hollow portion of the connecting unit 8 and that do not penetrate into the housing 3. The dust box 11D is provided adjacent to one end of the cover 9 in the direction Y. The dust box 11E is provided adjacent to the other end of the cover 9 in the direction Y.

The rail 11B is movable within a range between a position at which the movable portion 11A is located above the dust box 11D and a position at which the movable portion 11A is located above the dust box 11E.

On a surface of the movable portion 11A facing the housing 3, the sweeper T (see FIG. 1), which is, for example, a brush or a blade, is provided. The sweeper T comes into contact with the front surface of the cover 9 in a state where the rail 11B is moved by the second driving motor in the direction Y and the movable portion 11A is located above the cover 9.

The sweeper T is a portion, of the movable portion 11A, that can come into contact with the front surface of the cover 9, and the width of this portion in the direction X is narrower than the width of the light exit area 90 in the direction X.

In the object removing mechanism 11, in a state where the movable portion 11A is located at any position in the direction X as illustrated in FIG. 4, the rail 11B is moved in the direction Y to move the movable portion 11A to a position above the dust box 11D. With this operation, the sweeper T of the movable portion 11A moves in the direction Y while scraping the front surface of the cover 9, and therefore, an object adhered to a region that is scraped by the sweeper T is wiped off with the sweeper T, swept into the dust box 11D, and removed.

As described above, the object removing mechanism 11 is configured to have the movable portion 11A that is movable in the direction Y and in the direction X orthogonal to the direction Y along the front surface of the cover 9 and that moves in the direction Y to scrape the front surface of the cover 9.

Figure 6:
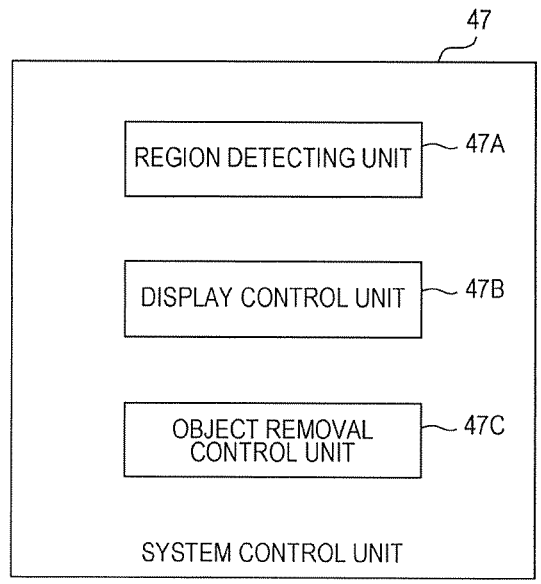
FIG. 6 is a functional block diagram of a system control unit 47 illustrated in FIG. 3.

FIG. 6 is a functional block diagram of the system control unit 47 illustrated in FIG. 3.

The system control unit 47 includes a region detecting unit 47A, a display control unit 47B, and an object removal control unit 47C. The region detecting unit 47A, the display control unit 47B, and the object removal control unit 47C are functional blocks implemented by the processor of the system control unit 47 executing the programs including the control program stored in the ROM.

The region detecting unit 47A analyzes captured image data input from the image capturing unit 10 and detects a region (hereinafter referred to as an object adhesion region) in which an object is adhered to the front surface (specifically, the light exit area 90) of the cover 9. The object includes waste, dust, liquids, sebum, etc. spreading to an extent that may affect the display quality of the HUD 100.

For example, reference captured image data obtained by the image capturing unit 10 capturing an image of the front surface of the cover 9 in a clean state where an object is not adhered at all is stored in advance in the ROM of the system control unit 47, and the region detecting unit 47A compares the reference captured image data with captured image data input from the image capturing unit 10 to detect an object adhesion region.

Specifically, the region detecting unit 47A compares the reference captured image data with captured image data input from the image capturing unit 10 and detects change regions, in the captured image data input from the image capturing unit 10, in which the tone changes to a large degree relative to the reference captured image data. The region detecting unit 47A detects a change region, among the change regions, having an area equal to or larger than a threshold as an object adhesion region.

Even in a case where only change regions having an area smaller than the threshold are present, if a plurality of such change regions are present close to each other, the region detecting unit 47A may detect a region that includes the plurality of change regions as an object adhesion region.

The display control unit 47B controls image information to be input to the driving unit 45 to control images to be displayed by the projection display unit 49.

The object removal control unit 47C controls operations of the object removing mechanism 11. In a case where predetermined display content is included in a portion of image light that is projected onto the windshield 2 through the cover 9, the portion being blocked due to the object adhesion region detected by the region detecting unit 47A, the object removal control unit 47C instructs the first driving motor and the second driving motor to activate the object removing mechanism 11.

In the HUD 100, the projection display unit 49 can display a plurality of pieces of display content for each of which a degree of importance from the viewpoint of safety (degree of importance concerning safety) is set in advance. Specifically, the degree of importance of a piece of display content is set to a higher value as the piece of display content has a closer relation to safety.

For example, for warning information for urging the driver to take an action for safety, such as information for informing the driver that the driver needs to pay attention to a person or an obstacle, such as another vehicle, the highest degree of importance is set. On the other hand, for information for navigation, information about the states of the measuring instruments of the automobile 1, information about the present time that is not directly related to the automobile 1, etc., a degree of importance lower than that for warning information is set.

The predetermined display content described above is display content having a degree of importance equal to or higher than the threshold. As the threshold, for example, the maximum degree of importance may be set.

For example, as illustrated in FIG. 5, a case is assumed where the image 20a showing travel speed information, the image 20b showing navigation information, and the image 20c showing warning information are included in image light that is projected through the cover 9 as display content.

In a case where an object adhesion region is present on the optical path of light for displaying the image 20c, display content showing the warning information is included in a portion of the image light projected through the cover 9, the portion being blocked due to the object adhesion region. The warning information has a degree of importance equal to or higher than the threshold, and therefore, the object removal control unit 47C activates the object removing mechanism 11 in this case to remove an object in the object adhesion region.

On the other hand, in a case where an object adhesion region is present on the optical path of light for displaying the image 20a or the image 20b, display content having a degree of importance equal to or higher than the threshold is not included in a portion of the image light projected through the cover 9, the portion being blocked due to the object adhesion region. Therefore, in this case, the object removal control unit 47C does not activate the object removing mechanism 11.

Figure 7:
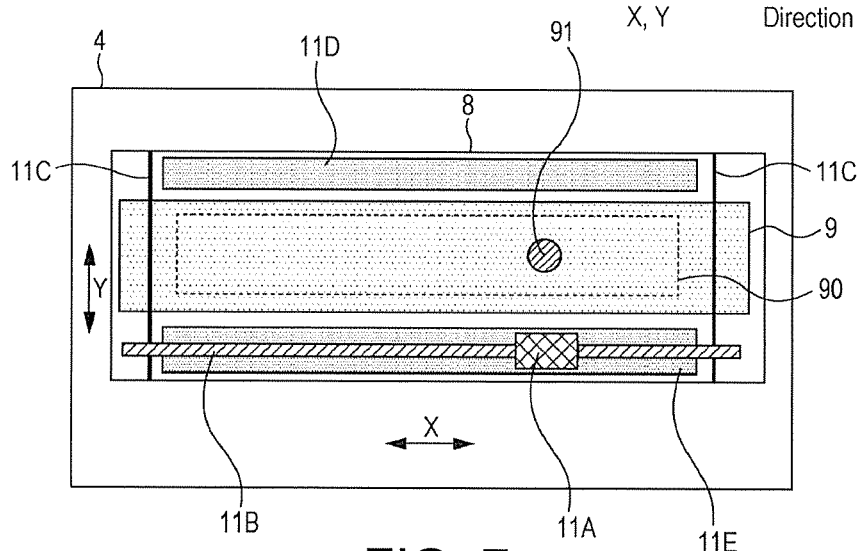
FIG. 7 is a schematic diagram for describing an object removing operation performed by the object removing mechanism 11.
Figure 8:
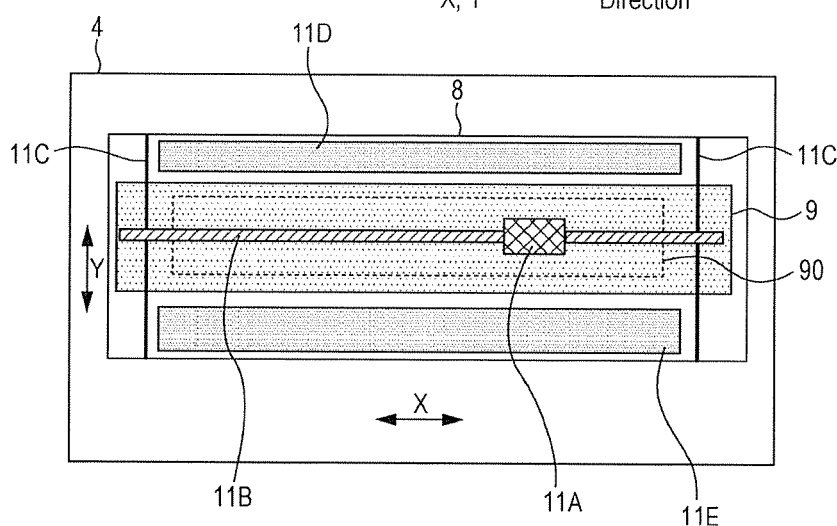
FIG. 8 is a schematic diagram for describing an object removing operation performed by the object removing mechanism 11.
Figure 9:
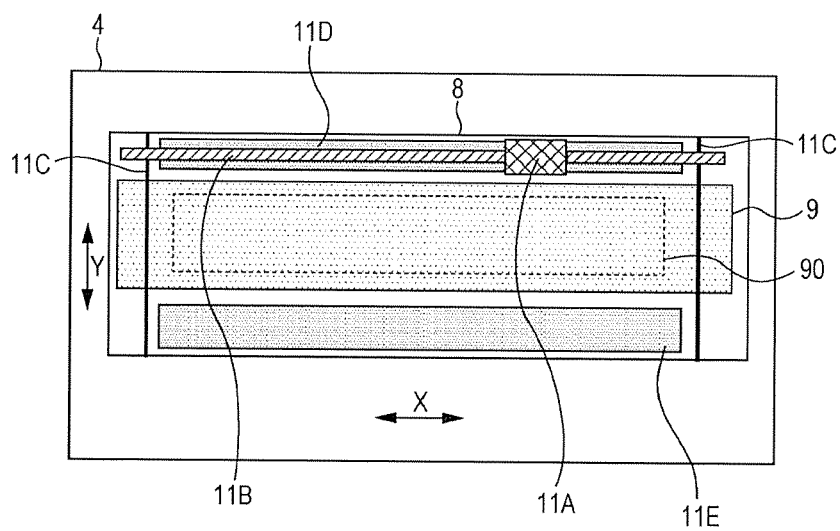
FIG. 9 is a schematic diagram for describing an object removing operation performed by the object removing mechanism 11.

FIG. 7 to FIG. 9 are schematic diagrams for describing an object removing operation performed by the object removing mechanism 11.

In a case of removing an object 91 adhered to the light exit area 90, the object removal control unit 47C first controls the first driving motor to align the sweeper T of the movable portion 11A with an object adhesion region, which is detected by the region detecting unit 47A and in which the detected object 91 is adhered, in the direction X as illustrated in FIG. 7.

Next, the object removal control unit 47C controls the second driving motor to move the rail 11B in a direction from a position above the dust box 11E toward the dust box 11D, as illustrated in FIG. 8, and to eventually move the rail 11B to a position above the dust box 11D, as illustrated in FIG. 9. In this movement process of the rail 11B, the object 91 is swept into the dust box 11D by the sweeper T of the movable portion 11A and is removed from the front surface of the cover 9.

Figure 10:
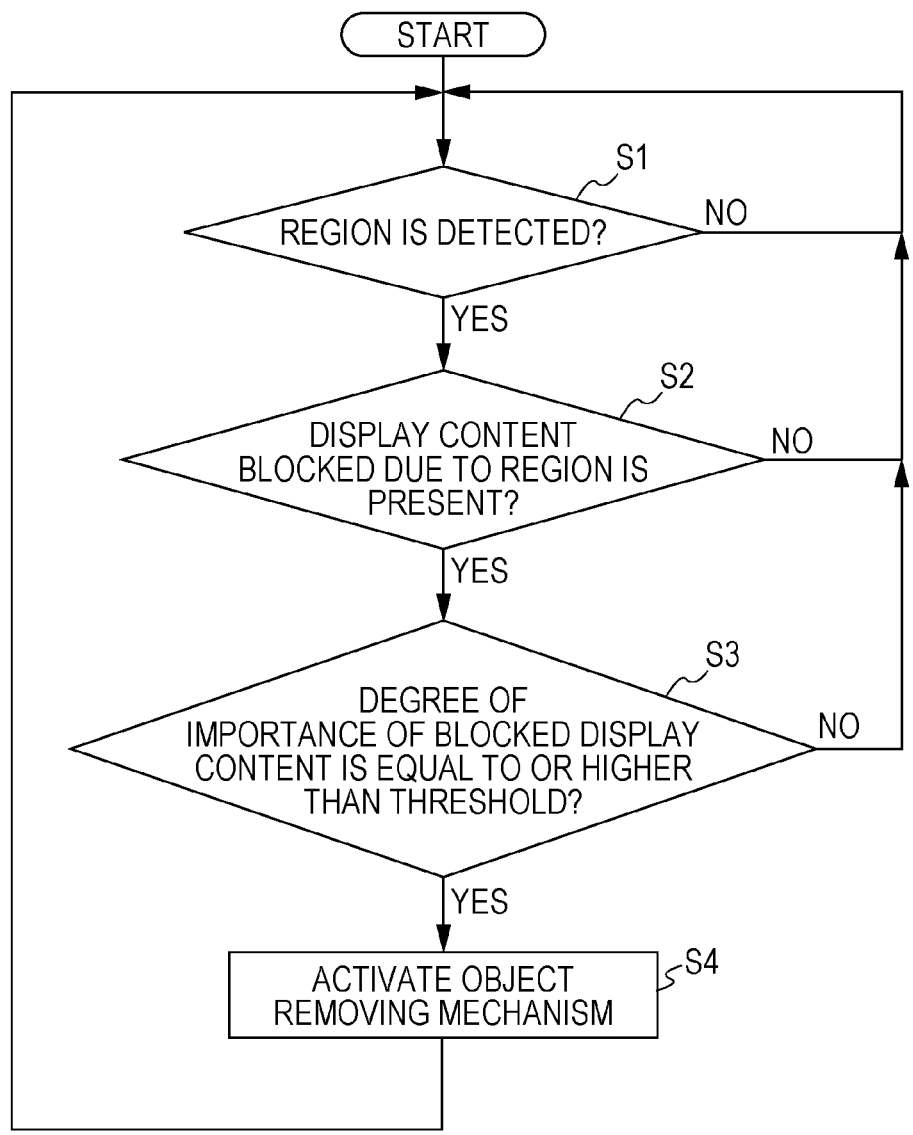
FIG. 10 is a flowchart for describing operations of the HUD 100 illustrated in FIG. 1.

FIG. 10 is a flowchart for describing operations of the HUD 100 illustrated in FIG. 1. When the HUD 100 is activated and the projection display unit 49 starts displaying images, the flow illustrated in FIG. 10 starts.

First, the object removal control unit 47C determines whether an object adhesion region is detected by the region detecting unit 47A (step S1).

If the determination in step S1 results in NO, the process in step S1 is repeated. If the determination in step S1 results in YES, the object removal control unit 47C determines whether display content blocked due to the detected object adhesion region is present in image light projected toward the windshield 2 through the cover 9 (step S2).

The relation between the position of each pixel of image information input to the driving unit 45 and a light transmission position corresponding to the pixel in the light exit area 90 is known in advance. Therefore, it is possible to determine whether display content that is blocked due to the object adhesion region is present in the image light on the basis of the relation between the position of the display content in the image information and the position of the object adhesion region.

If the determination in step S2 results in NO, the flow returns to step S1. If the determination in step S2 results in YES, the object removal control unit 47C checks the degree of importance of the display content that is blocked due to the object adhesion region, and determines whether the degree of importance is equal to or higher than a threshold (step S3).

If the degree of importance is lower than the threshold, the flow returns to step S1. If the degree of importance is equal to or higher than the threshold, the object removal control unit 47C activates the object removing mechanism 11 and removes an object located at a position at which the object blocks the display content (step S4, object removal control step). After the object has been removed, the flow returns to step S1. The operations described above are repeated while images are displayed.

As described above, with the HUD 100, even when an object is adhered to the cover 9, the object removing mechanism 11 is activated and the object is removed only in a case where the degree of importance of display content that is blocked by the object is equal to or higher than a threshold. Therefore, it is possible to reduce opportunities for activating the object removing mechanism 11, to decrease the frequency of the sweeper T scraping the front surface of the cover 9, and to protect the cover 9 from being worn.

With the HUD 100, the object removing mechanism 11 causes the sweeper T having a width narrower than that of the light exit area 90 in the direction X to scrape only a necessary area in the light exit area 90 to remove an object. Therefore, compared to a case where the entire light exit area 90 is scraped in order to remove an object adhered to the light exit area 90, the cover 9 can be protected from being worn.

The width of the sweeper T in the direction X is narrow, and therefore, even when the sweeper T is moving along the front surface of the cover 9, an area in which image light is blocked by the sweeper T can be small. Accordingly, it is possible to prevent quality degradation in displayed images when the object removing mechanism 11 is operated.

In the above description, the image capturing unit 10 is provided above the cover 9; however, the image capturing unit 10 may be disposed inside the housing 3 so that an object adhesion region can be detected.

The configuration is employed in which the cover 9 fits in the opening portion K; however, any configuration may be employed as long as the cover 9 covers the opening portion K. For example, a configuration may be employed in which the cover 9 is fixed to an outer surface of the housing 3 and the back surface of the cover 9 covers the entire opening portion K, thereby covering the opening portion K.

Further, a configuration may be employed in which the width of the sweeper T of the object removing mechanism 11 in the direction X is made equal to or wider than the width of the light exit area 90 to clean the entire light exit area 90 as the rail 11B moves. Even with this configuration, it is possible to achieve the effect that the frequency of the front surface of the cover 9 being scraped is decreased.

The degree of importance of each of the plurality of pieces of display content that can be displayed by the projection display unit 49 may be manually set. For example, for a user who attaches importance to speed indication, the degree of importance can be set to the maximum value for speed information to prevent the speed information from being hidden. Note that, among the plurality of pieces of display content, it is preferable to prohibit changing of the degree of importance for a piece of display content that has the closest relation with safety.

Further, a configuration may be employed in which the object removing mechanism 11 controls the movement start position by moving the movable portion 11A in the direction Y and, in this state, moves the movable portion 11A in the direction X to remove an object. With the above-described configuration (the configuration in which the movable portion 11A is moved in the direction X to control the movement start position and, in this state, the movable portion 11A is moved in the direction Y to remove an object), the time taken for the movable portion 11A to move over the light exit area 90 can be decreased, and therefore, it is possible to prevent degradation in display quality when the object removing mechanism 11 is operated.

As described above, the following matters are disclosed herein.

(1) A projection display device including: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; an object removing mechanism that removes an object adhered to a front surface of the cover by scraping the front surface of the cover; a region detecting unit that detects an object adhesion region in which the object is adhered to the cover; and an object removal control unit that controls an operation of the object removing mechanism, in which the object removal control unit activates the object removing mechanism in a case where predetermined display content is included in a portion of the image light, the portion being blocked due to the object adhesion region detected by the region detecting unit.

(2) The projection display device according to (1), in which the object removing mechanism has a movable portion that is movable in a first direction and in a second direction orthogonal to the first direction along the front surface of the cover and that moves in the first direction to scrape the front surface of the cover; the movable portion has a portion that is contactable with the front surface of the cover and that has a width in the second direction narrower than a width of a light exit area in the second direction, the light exit area being an area in the front surface of the cover through which the image light exits; and the object removal control unit moves the movable portion in the first direction in a state where the movable portion is aligned with the object adhesion region detected by the region detecting unit in the second direction to remove the adhered object in the object adhesion region.

(3) The projection display device according to (1) or (2), in which the projection display unit is capable of displaying a plurality of pieces of display content for each of which a degree of importance concerning safety is set; and the predetermined display content is display content for which the degree of importance is equal to or higher than a threshold.

(4) A control method for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an object removing mechanism that removes an object adhered to a front surface of the cover by scraping the front surface of the cover, the control method including: a region detecting step of detecting an object adhesion region in which the object is adhered to the cover; and an object removal control step of controlling an operation of the object removing mechanism, in which in the object removal control step, the object removing mechanism is activated in a case where predetermined display content is included in a portion of the image light, the portion being blocked due to the object adhesion region detected in the region detecting step.

(5) The control method for a projection display device according to (4), in which the object removing mechanism has a movable portion that is movable in a first direction and in a second direction orthogonal to the first direction along the front surface of the cover and that moves in the first direction to scrape the front surface of the cover; the movable portion has a portion that is contactable with the front surface of the cover and that has a width in the second direction narrower than a width of a light exit area in the second direction, the light exit area being an area in the front surface of the cover through which the image light exits; and in the object removal control step, the movable portion is moved in the first direction in a state where the movable portion is aligned with the object adhesion region detected in the region detecting step in the second direction to remove the adhered object in the object adhesion region.

(6) The control method for a projection display device according to (4) or (5), in which the projection display unit is capable of displaying a plurality of pieces of display content for each of which a degree of importance concerning safety is set; and the predetermined display content is display content for which the degree of importance is equal to or higher than a threshold.

(7) A control program for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an object removing mechanism that removes an object adhered to a front surface of the cover by scraping the front surface of the cover, the control program causing a computer to execute a process including: a region detecting step of detecting an object adhesion region in which the object is adhered to the cover; and an object removal control step of controlling an operation of the object removing mechanism, in which in the object removal control step, the object removing mechanism is activated in a case where predetermined display content is included in a portion of the image light, the portion being blocked due to the object adhesion region detected in the region detecting step.

According to the present invention, it is possible to provide a projection display device, a control method for a projection display device, and a control program for a projection display device with which an exit surface through which image light exits is cleaned to the minimum necessary to maintain display quality.

REFERENCE SIGNS LIST

100 HUD
1 automobile
2 windshield
3 housing
4 dashboard
5 control unit
6 diffusion member
7 concave mirror
8 connecting unit
9 cover
10 image capturing unit
11 object removing mechanism
11A movable portion
11B, 11C rail
11D, 11E dust box
T sweeper
20 display area
20a, 20b, 20c image
40 light source unit
41r R light source
41g G light source
41b B light source
42r, 42g, 42b collimator lens
43 dichroic prism
44 light modulating device
45 driving unit
46 light source control unit
47 system control unit
47A region detecting unit
47B display control unit
47C object removal control unit
48 projection optical system
49 projection display unit
90 light exit area
91 object
H steering wheel
K opening portion
E eye
X, Y direction

What is claimed is:

1. A projection display device comprising:
a projection display unit that includes a light modulating unit spatially modulating light emitted from a light source on the basis of input image information and projects image light obtained as a result of spatial modulation onto a projection surface of a vehicle to display an image based on the image light;
a housing that accommodates the projection display unit and has an opening portion through which the image light exits;
a cover that covers the opening portion;
an object removing mechanism that comprises a sweeper and removes an object adhered to a front surface of the cover by having the sweeper to scrape the front surface of the cover;
a region detecting unit that detects an object adhesion region in which the object is adhered to the cover; and
an object removal control unit that controls an operation of the object removing mechanism, wherein
in a case where predetermined display content is included in a portion of the image light, the portion being blocked due to the object adhesion region detected by the region detecting unit, the object removal control unit activates the object removing mechanism to automatically remove the object adhered to the front surface of the cover by enabling the sweeper to scrape the front surface of the cover, wherein each of a plurality of pieces of display content which is able to be displayed by the projection display unit is set with a degree of importance concerning safety, wherein the degree of importance of a piece of display content corresponds to a value set in relation to safety, and the predetermined display content is display content for which the degree of importance is equal to or higher than a threshold, wherein the threshold is a preset value representing a maximum degree of importance.

2. The projection display device according to claim 1, wherein
the object removing mechanism has a movable portion that is movable in a first direction and in a second direction orthogonal to the first direction along the front surface of the cover and that moves in the first direction to scrape the front surface of the cover,
the movable portion has a portion that is contactable with the front surface of the cover and that has a width in the second direction narrower than a width of a light exit area in the second direction, the light exit area being an area in the front surface of the cover through which the image light exits, and
the object removal control unit moves the movable portion in the first direction in a state where the movable portion is aligned with the object adhesion region detected by the region detecting unit in the second direction to remove the adhered object in the object adhesion region.

3. A control method for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion;

and an object removing mechanism that removes an object adhered to a front surface of the cover by scraping the front surface of the cover, the control method comprising:
- a region detecting step of detecting an object adhesion region in which the object is adhered to the cover; and
- an object removal control step of controlling an operation of the object removing mechanism that comprises a sweeper, wherein
- in a case where predetermined display content is included in a portion of the image light, the portion being blocked due to the object adhesion region detected in the region detecting step, the object removal control step further comprises activating the object removing mechanism to automatically remove the object adhered to the front surface of the cover by enabling the sweeper to scrape the front surface of the cover, wherein each of a plurality of pieces of display content which is able to be displayed by the projection display unit is set with a degree of importance concerning safety, wherein the degree of importance of a piece of display content corresponds to a value set in relation to safety, and the predetermined display content corresponds to a value set in relation to safety, and the predetermined display content is display content for which the degree of importance is equal to or higher than a threshold, wherein the threshold is a preset value representing a maximum degree of importance.

4. The control method for a projection display device according to claim 3, wherein
- the object removing mechanism has a movable portion that is movable in a first direction and in a second direction orthogonal to the first direction along the front surface of the cover and that moves in the first direction to scrape the front surface of the cover,
- the movable portion has a portion that is contactable with the front surface of the cover and that has a width in the second direction narrower than a width of a light exit area in the second direction, the light exit area being an area in the front surface of the cover through which the image light exits, and
- in the object removal control step, the movable portion is moved in the first direction in a state where the movable portion is aligned with the object adhesion region detected in the region detecting step in the second direction to remove the adhered object in the object adhesion region.

5. A non-transitory computer readable recording medium storing a control program for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an object removing mechanism that removes an object adhered to a front surface of the cover by scraping the front surface of the cover, the control program causing a computer to execute a process comprising:
- a region detecting step of detecting an object adhesion region in which the object is adhered to the cover; and
- an object removal control step of controlling an operation of the object removing mechanism that comprises a sweeper, wherein
- in a case where predetermined display content is included in a portion of the image light, the portion being blocked due to the object adhesion region detected in the region detecting step, the object removal control step further comprises activating the object removing mechanism to automatically remove the object adhered to the front surface of the cover by enabling the sweeper to scrape the front surface of the cover, wherein each of a plurality of pieces of display content which is able to be displayed by the projection display unit is set with a degree of importance concerning safety, wherein the degree of importance of a piece of display content corresponds to a value set in relation to safety, and the predetermined display content is display content for which the degree of importance is equal to or higher than a threshold, wherein the threshold is a preset value representing a maximum degree of importance.

* * * * *